May 7, 1929. L. S. MUNSON Re. 17,291
BUILDING BLOCK
Original Filed Oct. 18, 1922 2 Sheets-Sheet 1
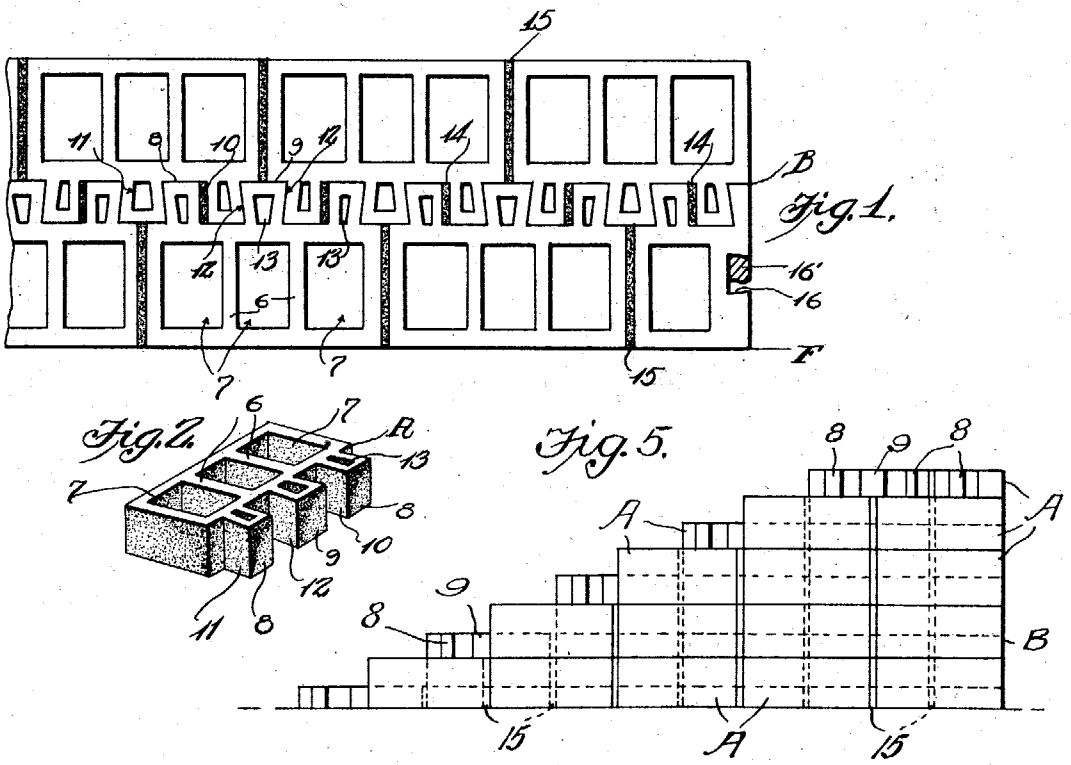
INVENTOR.
Luther S. Munson,
BY William C. Linton
ATTORNEY.

May 7, 1929. L. S. MUNSON Re. 17,291

BUILDING BLOCK

Original Filed Oct. 18, 1922 2 Sheets-Sheet 2

INVENTOR.
Luther S. Munson,
BY
William C. Linton
ATTORNEY.

Reissued May 7, 1929. Re. 17,291

UNITED STATES PATENT OFFICE.

LUTHER S. MUNSON, OF WASHINGTON, DISTRICT OF COLUMBIA, ASSIGNOR TO MUNSON AUTO LOCK TILE COMPANY, OF WASHINGTON, DISTRICT OF COLUMBIA.

BUILDING BLOCK.

Original No. 1,568,613, dated January 5, 1926, Serial No. 595,317, filed October 18, 1922. Application for reissue filed January 5, 1928. Serial No. 244,725.

The present invention relates to building blocks of the type employed in the construction of all species of permanent building structures such as manufacturing plants, office buildings, dwellings etc., as well as being adaptable for use in the construction of walls, bridges, conduits, etc.

Objects of this invention are to provide building blocks of sufficient miscellany to make their use practical in the construction of buildings of any size as well as allowing for the embellishment or ornamentation of the building; to provide building blocks which complement one another and are interengaged and locked; to provide a bonded wall which is fireproof as well as weather tight and air tight; and to provide blocks which are hollow to facilitate transportation and also reduce the cost of transportation to a minimum, yet permitting the blocks to be reinforced with a filler of plastic or other material wherever desired or found necessary in order to augment the durability of the wall or other structure in which the blocks are embodied.

It may be also stated to be an object of the invention to provide a wall composed of an outer and inner section of superimposed blocks, wherein the blocks of said sections have direct contact with each other and are without mortar beds or similar bonding means, hence permitting their laying by comparatively unskilled labor at no sacrifice of durability or other efficiency of a completed wall and with a material saving of labor and incident costs upon part of the builder.

It may be also stated that another of the principal desideratums of the invention is to provide through the instrumentalities of my invention, a wall wherein the component parts thereof will be permitted of relative movement or adjustment upon stressing of the wall, without liability of premature failure as by disjointure of said component parts, hence, materially increasing the strength, both lateral and compressive of the same.

Numerous other objects of this invention will be apparent from the following description of the present invention taken in connection with the accompanying drawings wherein:

Figure 1 is a fragmentary plan view of a wall embodying blocks constructed in accordance with this invention;

Figure 2 is a perspective view of the form of block shown in Figure 1;

Figure 5 is a fragmentary elevational view of a wall illustrating use of the blocks, constructed in accordance with this invention.

Figures 3, 4:
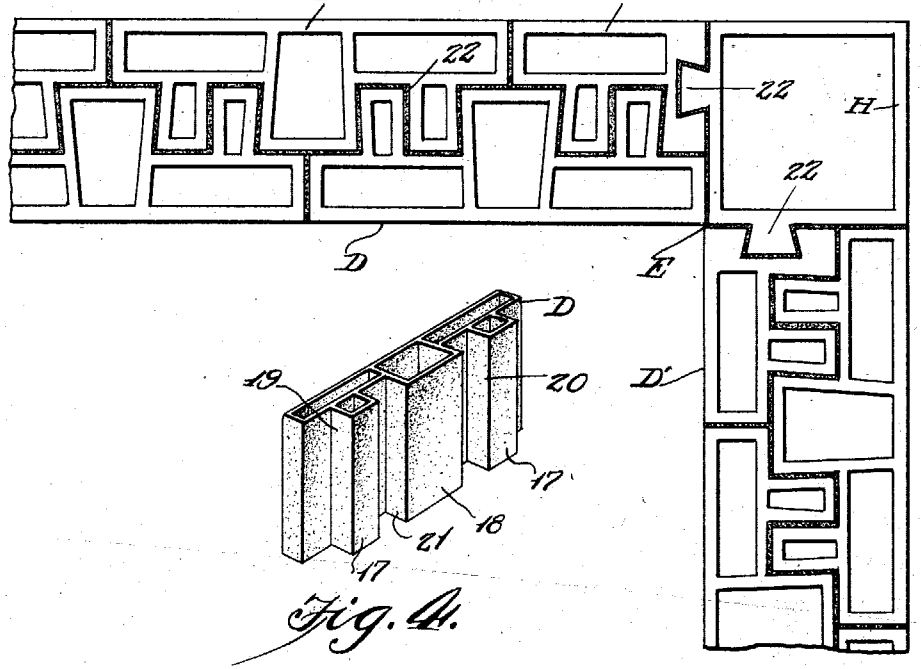
Figure 3 is a fragmentary plan view of a wall constructed in accordance with this invention employing blocks of a different configuration from those shown in Figures 1 and 2.
Figure 4 is a perspective view of a block such as that employed in Figure 3.

In reducing this invention to practice a block A, such as shown in Figure 2 of the drawings, may be used in the construction of a wall B, as shown in Figures 1 and 5. Or, if desired, the blocks may be of the configuration indicated at D, shown in Figure 4, and embodied in a wall E, as illustrated in Figure 3 of the drawings.

The block A may be of substantially the same size as a standard brick and may also be of the configuration shown in Figure 2. The block is preferably hollow and equipped with intermediate strengthening walls 6 which extend transversely thereacross. These walls divide the block into a series of compartments 7 which may be hollow, as shown, or filled with a plastic composition or the like whenever desired or found necessary. One side of each block is equipped with a pair of projections 8, one of which is arranged in proximity to each end of the block, while a projection 9 extends from the block between the projections 8. Upon reference to Figure 1, of the drawings it will be noted that the inner wall of each projection 8 is straight, as indicated at 10, while the opposite wall is inclined as indicated at 11. Each of the projections 9 has the side walls 12 thereof inclined or converged so that the contour of the projection 9 is dovetailed. The projections 8 and 9 may be formed solid or with openings 13.

In the formation of a wall with these blocks an outer and inner section is preferably established and each section consisting of a plurality of vertical tiers or rows of superimposed layers of blocks whereby to effect a continuous vertical line of jointure between the various juxtaposed blocks of said layers as is shown in Figure 5. The tiers of one section being staggered with respect to the tiers of the other section in order to have one block A of a tier of one section interfitted with two parallelly arranged blocks of a corresponding layer of two tiers of the other section, as shown in Figure 1, so as to provide a continuous union of the blocks. The intermediate projection 9 of one block is positioned between the terminal projections 8 of two adjacent blocks and the inclined faces 11 of said adjacent blocks engaged with the inclined faces 12 of the projection 9. This provides spaces between the straight faces 10 of the projections on the parallelly arranged blocks which are adapted for the reception of a plastic composition 14 capacitating as a bond or key. Also, spaces are provided between the ends of the block bodies which are also filled with a plastic composition, as indicated at 15, thereby bonding the bodies of the blocks, together. The spaces between the ends of the block bodies are predetermined, consequently, the artisan in assembling the blocks in a wall can expeditiously determine whether or not the parallelly arranged blocks have been actuated together into the desired contiguity before the plastic composition is deposited between the projections and the block bodies.

When the blocks are arranged in superimposed layers as for example, when building a wall therewith, the interlocking jointure as between said blocks and their relative arrangement is such as to dispense with the necessity of mortar beds or similar bonding means or material between the rows. By reason of this, it will be understood and appreciated that the improved blocks may be laid by unskilled or comparatively unskilled labor without sacrificing the efficiency of the completed wall and also, effecting a material saving of labor and time outlay upon part of the builder.

Wherever desired or found necessary, a portion only of a block may be used, such as indicated at F in Figure 1, especially where it is necessary to finish the terminus of a wall. Also, the fragment of a block may be provided with a recess 16 of dovetail or other configuration in which a wooden "buck" 16′ or the like may be mounted to which a window or a door frame can be anchored.

The block D has a pair of projections 17 extending laterally from one face thereof adjacent the opposite ends of the body of the block. The projections may be either tubular as shown in Figure 4, or solid. A central projection 18 is formed in the body of the block D intermediate the projections 17. The projection 18 may also be tubular, as shown, or solid and has its conception at the inner face of the wall of the block opposite to that which carries the projections 17. The wall of the block which carries the projections 17 is intersected by the projection 18. The block D may be of any size and may be embodied in a wall with symmetrical blocks or with blocks of various configurations which are equipped with projections interfitting with the projections 17 and 18. The outer wall of each projection 17 is oblique or inclined, as indicated at 19, while the inner wall thereof is straight, as indicated at 20. The opposite walls 21 of the projection 18 diverge outwardly. Consequently, in assembling the blocks the oblique faces 19 of the projections 17 may be urged into engagement with the correspondingly formed faces 21 of the projection 18 thereby providing spaces between the straight sides 20 of the projections 18 into which a plastic material 22 may be introduced for the purpose of bonding the blocks together. The ends of the blocks receive a filler of plastic composition therebetween.

From the above, it is apparent that the wall is constructed in the same manner immaterial of whether blocks A or D are employed.

If desired corner column blocks may be used in order to add to the ornamental appearance of the walls or to bond the ends and side walls together. For instance in order to illustrate this feature of the invention I have in Figure 3 shown a corner block H which in the present instance is shown to be rectangular and is equipped with an integral dovetailed projection 22 on each of two faces thereof. Both of these lugs are adapted for engagement in complemental recesses formed in terminal blocks D′ which are fragments of the blocks D. It is of course to be understood that when the corner block H is used it must be slidably engaged in a vertical plane, with the right angled walls of the building. However, I am aware that in some instances such a construction would be impractical and that it would be necessary to laterally engage the corner blocks with the walls. Where there is either desired or found necessary a portion of each projection 22 may be removed and sufficient plastic composition introduced into the dove-tailed recesses of the blocks D′ to compensate for the portion of each projection 22 which is chipped off. Also, where desired the blocks H may be filled to produce a solid corner column.

In use of blocks constructed in accordance with this invention, it is understood that the outer faces of the blocks may be glazed or otherwise ornamented. Moreover, wherever desired, walls composed of the type of block herein shown may be faced by decorative blocks of any standard construction. It is the purpose of the present invention to utilize building blocks which may be manufactured at a relatively low cost, transported with facility and expedition at a minimum cost, and handled by the workmen with convenience. Moreover, the present invention employs blocks which may be embodied in a wall with precision, in order that the tiers of the wall will be positively bonded together. It is not necessary in the construction of a wall embodying the blocks of the present invention to require highly skilled artisans in this art, in order to afford effective results, since the horizontal shifting of the blocks after they have been interengaged, automatically seats them in proper position and it is necessary only to deposit the plastic composition at the desired places for securing the blocks.

Workers skilled in this particular art, will readily understand and appreciate that a wall constructed through the instrumentalities of my improved invention, will possess a materially greater lateral and compressive strength than those forms of tile or similar block walls heretofore prevalent in the art, in that the spaces between certain of the projections upon a block A will be such as to loosely receive the interengageable projection upon a block F and similarly, certain of the spaces upon the block F are of a size to loosely receive the interengageable projection or projections upon the opposed or juxtaposed block A, thereby providing a comparatively larger space between certain of the adjacent sides of the interengaged projections 8 whereby to compensate for relative movement between the interengaged or interlocked blocks, as may be caused by expansion or contraction of the same or by stressing thereof with the application of great loads to the wall, said space being adapted to receive therein a plastic bonding material or grouting 14 possessing a certain amount or degree of inherent resiliency and thus, effecting a positive but sufficiently yieldable bond to allow for slight relative movement or adjustment between the projections 8 so interengaged. Consequently upon this yieldable or flexible bonding between the projections 8 of the juxtaposed blocks, it will be understood that a certain degree of flexibility will be imparted to the constructed wall and this flexibility will serve to materially increase the strength of such wall, permitting it to carry, without premature failure, materially greater loads or stresses. Also, it will, be understood that because of the peculiar formation of the opposite sides of faces of the projections 8, that is, one side thereof being flat or straight as indicated at 10 and the opposite side being tapered as indicated at 11, the improved blocks may be interengaged in their juxtaposed relation to constitute a wall in a materially reduced length of time, inasmuch as the projections 8 upon one block may be slidably or laterally moved into interengagement with the corresponding projections upon the opposite block in alternate fashion, the blocks immediately subsequent to such laterally interengagement of their projections 8 being shifted sidewise or longitudinally so as to bring the adjacent tapered sides or faces 11 into contact as is shown in the Figures 1 and 3, hence, affording the advantages of what is known in this art as a dovetailed fit and thereby positively preventing relatively outward lateral movement of one interengaged block with respect to the adjacent block; following which, the plastic bonding material or grouting 14 is placed between the comparatively large spaces adjacent the juxtaposed straight sides or faces 10, hence, maintaining positive contact or engagement between the juxtaposed tapered faces 11 of said projections 8 and 9 and thus ensuring positive connection between the interengaged blocks whereby to prevent relative lateral or outward movement therebetween.

As hereinbefore explained, the superimposed layers of interengaged or interlocked blocks constituting my invention and making up a wall are laid directly one upon the other without the usual mortar beds or similar bonding means. Because of the dispensing with mortar beds or like bonding means between the superimposed layers of interlocked blocks, it is to be noted that the improved blocks may be laid by unskilled or comparatively unskilled labor since it is only necessary to place the blocks in superposed fashion one upon the other, during which the projections upon the adjacent sides thereof are interengaged and form thereby, a positive connection medium; spaces being left between the adjacent straight faces of the projections 8 whereby to compensate for relative movement between the interlocked blocks, as by expansion or contraction of the same or that movement necessary therebetween when a wall so constructed is subjected to great loads or stresses. In these spaces, a plastic bonding material such as is generally known in this art as grouting may be poured, as is indicated hereinbefore by the numeral 14.

It is moreover to be understood that the blocks of this invention may be made from any desired material and may be molded or otherwise formed and made of any dimensions. Also, various other changes may be made within the scope of the claims appended hereto.

What I claim is:

1. A building block including a body equipped with an intermediate and terminal projections on one face, said intermediate projection having the opposite sides thereof tapered and said terminal projections having their inner faces straight and their outer faces tapered.

2. A building block including a body equipped with an intermediate and terminal projections on one face, said intermediate projection having the opposite sides thereof tapered, and said terminal projections being spaced from the ends of said body and having their inner faces straight and their outer faces tapered.

3. A wall including blocks equipped with projections, certain of which having the opposite faces thereof disposed at angles more acute than a right angle, one face of each of the other projections being disposed at an angle more acute than a right angle, said blocks being movable to interengage said angular faces and provide spaces between certain of the opposite faces of the projections for the reception of a yieldable locking medium.

4. A wall construction including a body with intermediate and terminal projections on one face, said intermediate projection being of dovetail shape, the inner faces of the terminal projections being straight and the outer faces tapered and spaced from the terminals of said body, the tapered face of each terminal projection impinging against a side of the dovetail projection on an adjacent block, the straight side of each terminal projection being spaced from the corresponding side of a terminal projection on an adjacent block, and a plastic binder disposed in the space between said straight faces.

5. A wall construction comprising a plurality of juxtaposed blocks arranged in superimposed layers, whereby to effect a continuous vertical line of jointure between the various juxtaposed blocks of said layers, an interlocking connection between the blocks of each layer forming movement compensating spaces between the blocks and a yieldable bonding material received in said movement compensating spaces for retaining the blocks of each layer in interengaged contact.

6. A wall construction comprising an inner and outer section, each section consisting of a plurality of vertical tiers of superimposed layers of blocks, the layers of one section lying parallel with the layers of the other section, the tiers of one section being staggered with respect to the tiers of the other section, and a yieldable interlocking connection between the layers of blocks of both sections.

7. A wall comprising an inner and outer section, each section consisting of a plurality of superimposed layers of blocks arranged in vertical tiers whereby to effect a continuous vertical line of jointure between the various juxtaposed layers of blocks, projections formed on certain of the sides of said blocks and interengaged, certain of the adjacent sides of said projections being tapered and other of said adjacent sides of the projections being straight and having comparatively wide movement compensating spaces therebetween, the blocks of said superimposed layers having direct contact with each other and being free of bonding bedding material and a yieldable bonding material received in said movement compensating spaces whereby to maintain said tapered adjacent sides of the projections in constant interengaged contact.

In witness whereof, I have hereunto set my hand.

LUTHER S. MUNSON